United States Patent [19]
Ishii et al.

[11] Patent Number: 5,345,047
[45] Date of Patent: Sep. 6, 1994

[54] JOINING SEGMENTS OF THE SECONDARY IN A LINEAR MOTOR DRIVEN ELEVATOR APPARATUS

[75] Inventors: Toshiaki Ishii; Masamoto Mizuno; Kazuhiko Sugita, all of Inazawa, Japan

[73] Assignee: Mitsubishi Denki Kabushiki Kaisha, Tokyo, Japan

[21] Appl. No.: 953,710

[22] Filed: Sep. 30, 1992

[30] Foreign Application Priority Data

Mar. 23, 1992 [JP] Japan ................................. 4-064345

[51] Int. Cl.$^5$ .......................... B66B 1/06; H02K 41/00
[52] U.S. Cl. ..................................... 187/112; 187/95; 187/94; 310/12
[58] Field of Search ............. 187/95, 112, 94; 310/12, 13; 124/88 B; 361/378, 341; 30/675, 611

[56] References Cited

U.S. PATENT DOCUMENTS

| | | | |
|---|---|---|---|
| 3,882,265 | 5/1975 | Johnston et al. | 174/88 B |
| 4,008,365 | 2/1977 | Carlson | 174/68 B |
| 5,033,588 | 6/1991 | Nakai et al. | 187/95 |
| 5,062,501 | 11/1991 | Pavoz et al. | 187/112 |
| 5,141,082 | 8/1992 | Ishii et al. | 187/110 |
| 5,203,432 | 4/1993 | Grinaski | 187/94 |

FOREIGN PATENT DOCUMENTS

| | | | |
|---|---|---|---|
| 0131642 | 11/1978 | Japan | 187/95 |
| 1271381 | 3/1989 | Japan | |
| 0098977 | 4/1991 | Japan | 187/95 |
| 0628071 | 10/1978 | U.S.S.R. | 187/95 |
| 1047814 | 10/1983 | U.S.S.R. | 187/95 |

*Primary Examiner*—R. Skudy
*Assistant Examiner*—Robert Nappi
*Attorney, Agent, or Firm*—Leydig, Voit & Mayer

[57] ABSTRACT

The present invention provides a linear motor driven elevator apparatus which enables a decrease in the thrust variation at the passage of primary windings of a linear induction motor loaded on a car or a balance weight through joints of secondary conductors and which can prevent an unpleasant impression from being given to the passengers.

In the elevator apparatus, each of the connections of the secondary conductor members of the linear induction motor serving as a drive source for vertically driving an elevator car has a structure in which each of the secondary conductor members is notched to about half of the thickness thereof, and the notch portions are superposed. The length of each of the notch portions is set to a value greater than the pole pitch of the primary windings of the linear induction motor, and the set heights of the joints are different from each other.

4 Claims, 6 Drawing Sheets

JOINING SEGMENTS OF THE SECONDARY IN A LINEAR MOTOR DRIVEN ELEVATOR APPARATUS

BACKGROUND OF THE INVENTION

1. Field of the Invention

The present invention relates to a linear motor driven elevator apparatus in which a car is moved using as a power source a linear induction motor.

2. Description of the Related Art

Figure 7:
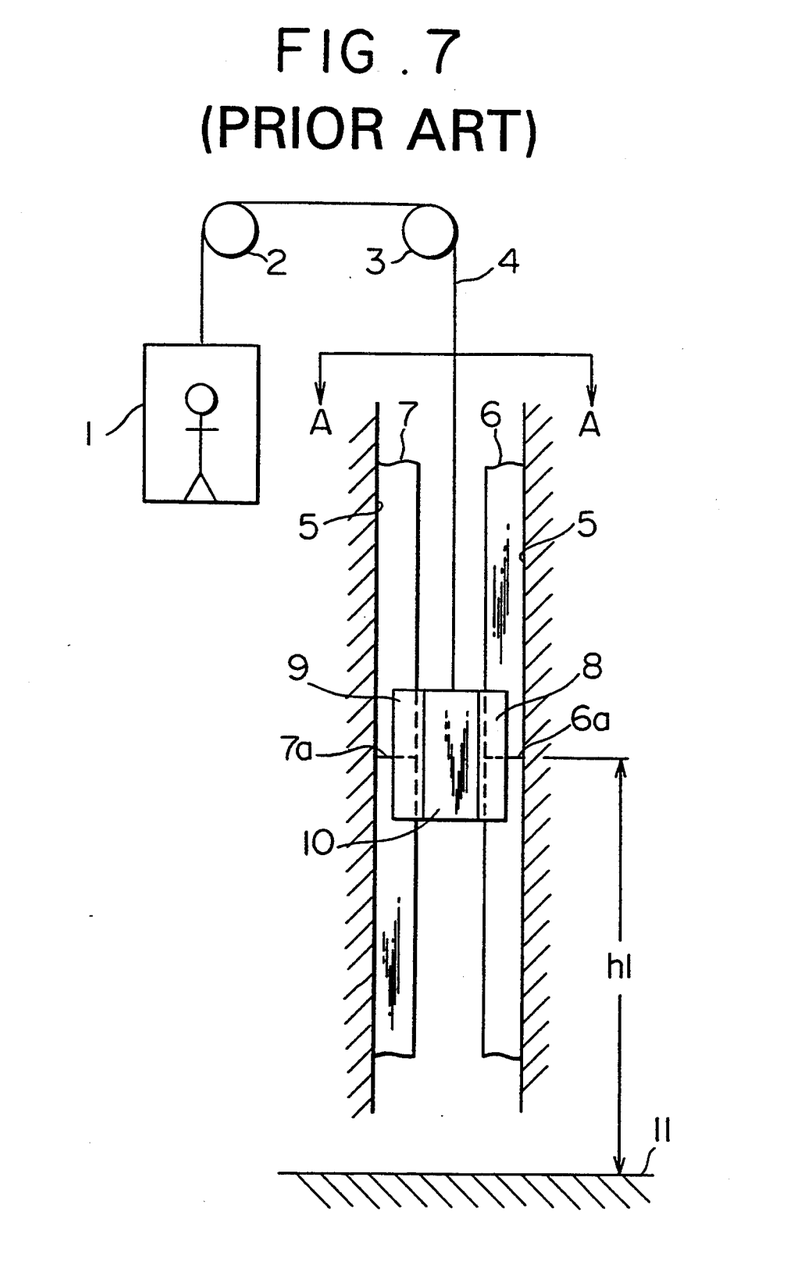
FIG. 7 is a schematic drawing showing an example of conventional linear motor driven elevators.

An example of this type of apparatus is the linear motor driven elevator disclosed in Japanese Patent Laid-Open No. Hei 1-271381. FIG. 7 is a schematic drawing showing an example of the arrangements of conventional linear motor driven elevators. In FIG. 7, reference numeral 1 denotes a car, reference numerals 2 and 3 denote pulleys, and reference numeral 4 denotes a rope for suspending the car 1 and a balance weight 4 through the pulleys 2 and 3 like a well bucket. Reference numeral 5 denotes an elevator passage wall, and reference numerals 6 and 7 denote secondary conductors, for example, made of aluminum (or copper), which are fixed to the elevator passage wall 5 so as to be opposed to each other. Reference numerals 6a and 7a denote joints of upper and lower secondary conductor members which form the secondary conductors 6 and 7, respectively. Reference numerals 8 and 9 each denote a primary winding of a linear induction motor loaded on the balance weight 10, and reference numeral 11 denotes the bottom of the elevator passage. The upper and lower secondary conductor members are connected to form a small gap at each of the joints 6a and 7a in consideration of the fact that a copper plate expands and contracts due to a temperature change in the environment where the elevator is installed, which is caused by a change in the season or the like.

Figure 8:
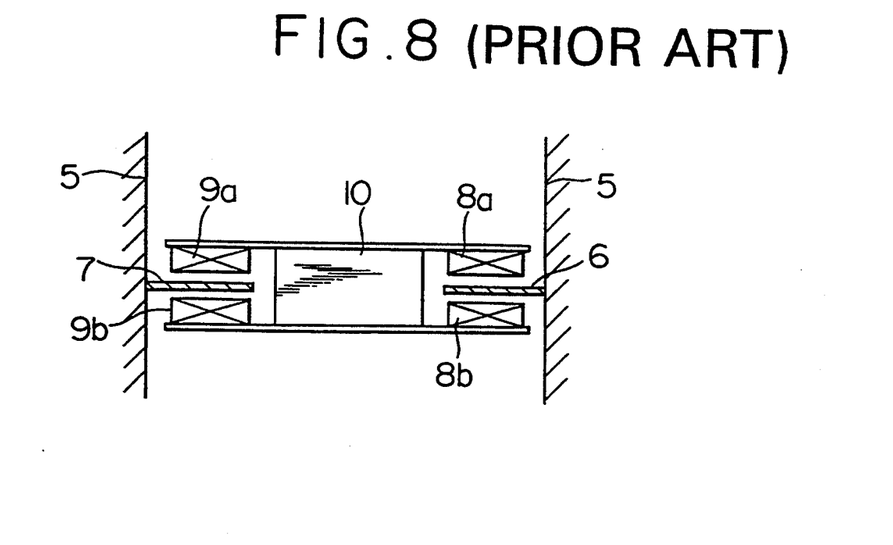
FIG. 8 is an enlarged sectional view taken along line A—A in FIG. 7.

FIG. 8 is an enlarged sectional view taken along line A—A in FIG. 7. In FIG. 8, reference numerals 8a, 8b and 9a, 9b denote the primary windings which are disposed on both sides of the respective secondary conductors opposite to each other with a predetermined gap therebetween to constitute a double-side linear induction motor.

In the linear motor-driven elevator arranged as described above, the car 1 is moved by the thrust generated by the interaction between an induced eddy current generated in each of the secondary conductors 6 and 7 and a shifting magnetic field generated at each of the gaps between the primary windings 8a and 8b and between the primary windings 9a and 9b. The shifting magnetic field is generated by exciting the primary windings 8 and 9 of the linear induction motor loaded on the balance weight 10, and the induced eddy current is generated by the shifting magnetic field. Namely, the balance weight 10 is driven by the relative thrust generated between the primary windings 8, 9 of the linear induction motor loaded on the balance 10 and the secondary conductors 6, 7. The thrust of the balance weight 10 is transmitted to the car 1 through the rope 4 so that the car 1 is upwardly and downward moved along a car rail (not shown) provided in the elevator passage. In this way, the elevator is operated.

Figure 9:
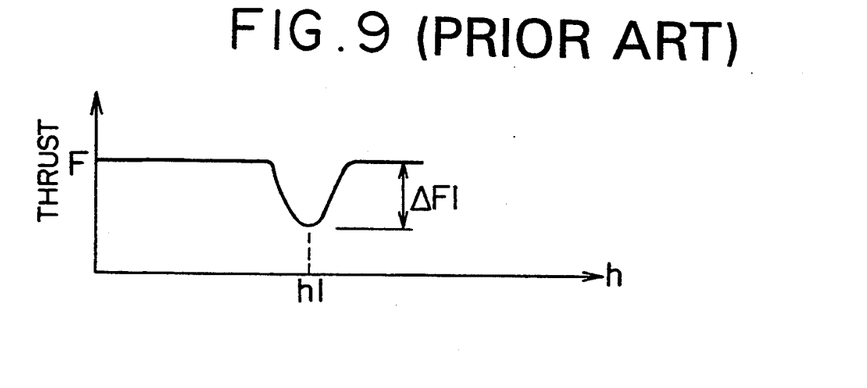
FIG. 9 is a diagram showing characteristics with respect to a thrust decrease in a conventional linear motor driven elevator.
Figure 10:
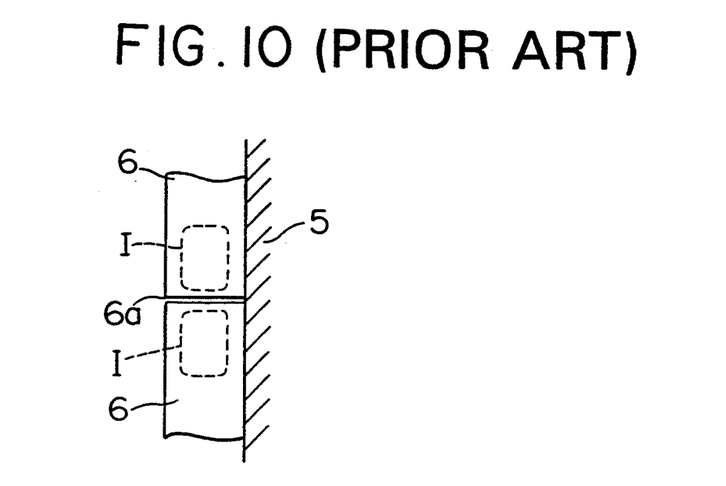
FIG. 10 is a front view showing details of the connection of the secondary conductor members in a conventional linear motor driven elevator.

In the conventional linear motor-driven elevator arranged as described above, the primary windings 8 and 9 of the linear induction motor loaded on the balance weight 10 are simultaneously passed through the joints 6a and 7a, respectively, of the secondary conductors 6 and 7, which are placed at a height h1 from the bottom 11 of the elevator passage. The thrust F is thus decreased by $\Delta F1$ with a center at the position h1 during passage through the joints, as shown in FIG. 9. This thrust change is generated due to the phenomenon that the eddy current I flowing through the secondary conductors 6 and 7 intermittently flows through the joints 6a and 7a, which phenomenon is caused by the presence of the gaps at the joints 6a and 7a of the secondary conductors 6 and 7, as shown in FIG. 10. The decrease $\Delta F1$ in the thrust causes the non-smooth movement of the car 1 each time the primary windings 8 and 9 pass through the joins 6a and 7a, respectively, thereby causing the problem of giving a jerking sensation to the passengers.

SUMMARY OF THE INVENTION

Considering the above point, an object of the present invention is to provide a linear motor driven elevator apparatus which permits a decrease in the thrust change produced when primary windings of a linear induction motor loaded on a car or a balance weight are respectively passed through joints of secondary conductors, thereby removing the unpleasant impression given to passengers.

A linear motor driven elevator apparatus in accordance with a first invention of the present invention comprises secondary conductors each of which is disposed in an elevator passage and has a plurality of secondary conductor members connected in series in the lengthwise direction thereof so as to be abutted against each other; and a linear induction motor loaded on a car or a balance weight and having primary windings disposed near the secondary conductors. In each of the connections between the secondary conductor members, each of the secondary conductor members is notched to about half of the thickness thereof, and the notch portions are superposed. In addition, the length of the notch connection of each of the secondary conductor members is set to be a value greater than the pole pitch $\tau$ of the primary windings of the linear induction motor. Further, the secondary conductors are arranged in a plurality of lines, and the primary windings of the linear induction motor are respectively provided in correspondence with the lines of the secondary conductors. The set height of the notch connection of the secondary conductor members differs with the line of the secondary conductor by a distance which is set to a value greater than the length L of the primary windings of the linear induction motor in the travel direction thereof.

A linear motor driven elevator apparatus in accordance with a second embodiment of the present invention comprises secondary conductors each of which is disposed in an elevator passage and has a plurality of secondary conductor members connected in series in the lengthwise direction thereof so as to be abutted against each other, and a linear induction motor loaded on a car or a balance weight and has primary windings respectively disposed near the secondary conductors. Each of the secondary conductor members is formed by superposing a plurality of plate materials, the set heights of the joints of the plate materials in the lengthwise direction thereof are different from each other by a distance which is set to a value greater than the length of the primary windings of the linear induction motor in the travel direction thereof.

In the first embodiment of the present invention, in the connection of the secondary conductor members, each of the secondary conductor members is notched to about half of the thickness thereof, and the notch portions of the members are superposed. This prevents the secondary conductor members from being completely divided in the lengthwise direction thereof, and causes the eddy current to continuously flow through the joint portions, thereby significantly decreasing the thrust change at the joint portions. In addition, since the length of the notch connection of each of the secondary conductor members is set to a value greater than the pole pitch $\tau$ of the primary windings of the linear induction motor, the thrust change produced when the primary windings are respectively passed through the notch portions of the secondary conductors is decreased, thereby stabilizing the travel of the car or the balance weight. Further, the secondary conductors are disposed in a plurality lines, the primary windings of the linear induction motor are respectively provided in correspondence with the lines of the secondary conductors, and the set height of the notch connection between the secondary conductor members differs with the line of the secondary conductor by a distance which is longer than that length of the primary windings of the linear induction motor in the travel direction thereof. During the passage through the joints, the thrust change does not simultaneously occur in the lines of the secondary conductors.

In the second embodiment of the present invention, each of the secondary conductor members is formed by superposing a plurality of plate materials, and the set heights of the joints of the superposed plate members in the lengthwise direction thereof are different from each other. This prevents the secondary conductor members from being completely divided in the lengthwise direction thereof, and causes the eddy current to continuously flow even through the joint portions, thereby significantly decreasing the thrust change at the joint portions, like the first invention. In addition, since the thickness of each of the secondary conductor members is increased, the amount of the eddy current flowing is increased, and greater thrust can thus be obtained. Further, since the set height of the joint of the plate materials differs with the secondary conductor member by a distance which is longer than the length L of the primary windings of the linear induction motor in the travel direction thereof, the thrust change produced when the primary windings are respectively passed through the joints of the secondary conductors is decreased, thereby stabilizing the travel of the balance weight.

DESCRIPTION OF THE PREFERRED EMBODIMENTS

Embodiment 1

Figure 1:
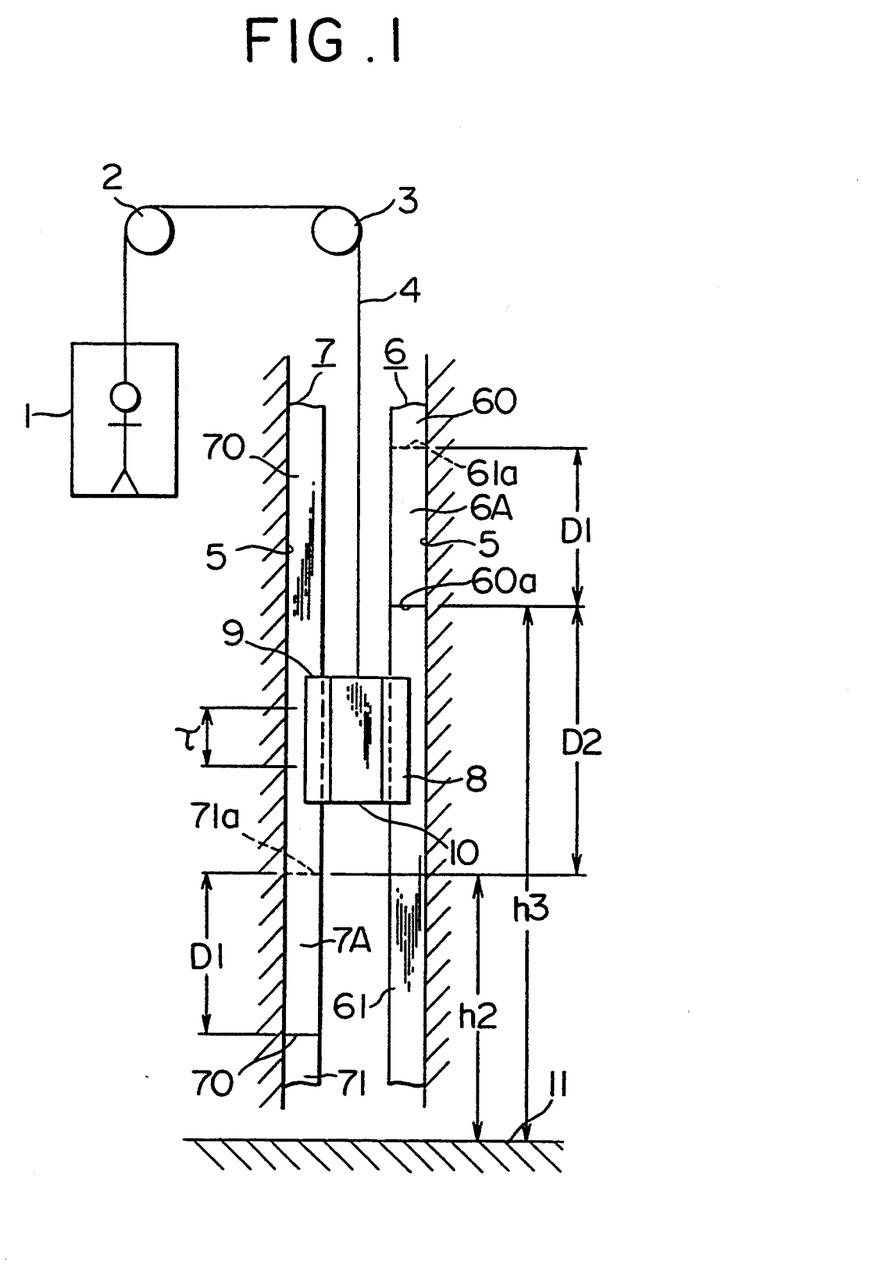
FIG. 1 is a schematic drawing showing the whole arrangement of a first embodiment of the present invention.
Figure 2A:
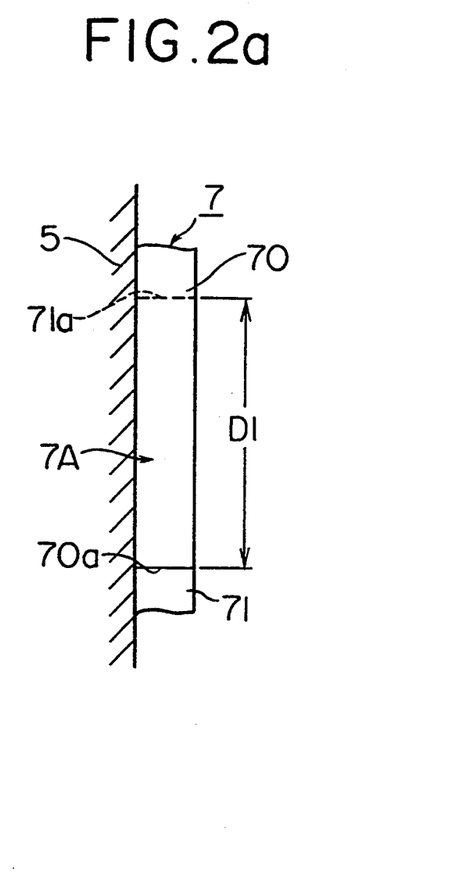
FIGS. 2(a) and 2(b) are a front view and a right side view, respectively, showing details of the connection of the secondary conductor members shown in FIG. 1.
Figure 2B:
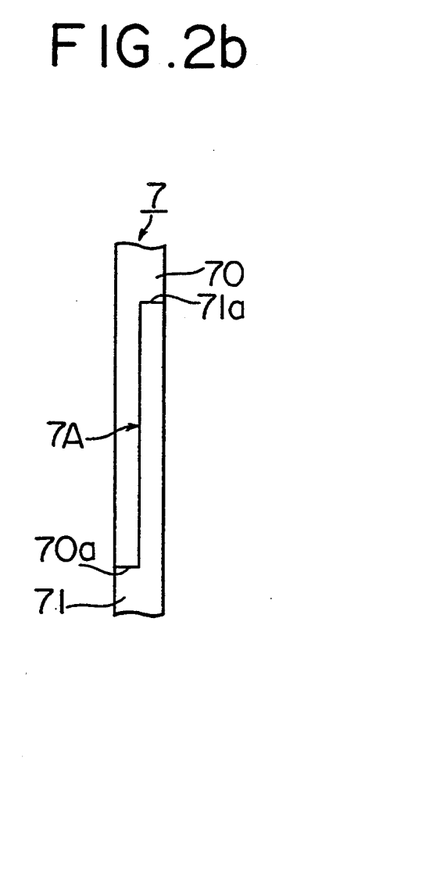

FIG. 1 is a schematic drawing showing the arrangement of a first embodiment of the present invention, and FIGS. 2(a) and 2(b) are an enlarged front view and right side view, respectively, showing a connection in a secondary conductor which is a principal portion. In this embodiment, the secondary conductors are disposed in two lines, and a connection in the secondary conductor in each line has a symmetrical structure. FIG. 2 shows a connection in one of the lines. In the drawings, reference numerals 1 to 5 and 8 to 11 denote the same portions as those in the conventional elevator shown in FIG. 7, and thus these portions are not described below. Reference numerals 6 and 7 respectively denote two lines of secondary conductors in accordance with the present invention. The secondary conductors 6 and 7 include upper and lower secondary conductor members 60, 61 and 70, 71, respectively, which are abutted against each other and arranged in series in a lengthwise direction along the elevator passage wall 5. In each of the connections 6A and 7A between the upper and lower secondary conductor members of the secondary conductors 6 and 7, the notch portions each having about half of the thickness and respectively formed in the secondary conductor members are superposed. Each of the lengths of the connections 6A and 7A in the secondary conductors 6 and 7 is set to a value greater than the pole pitch $\tau$ of the primary windings 8 and 9 of a linear induction motor. The length represents the distance D1 between the lower end 60a (referred to as the "joint" hereinafter) of the upper secondary conductor member 60 and the upper end (referred to as the "joint" hereinafter) 61a of the lower secondary conductor member 61 on the side of the secondary conductor 6, and the distance D1 between the lower end (referred to as the "joint" hereinafter) 70a of the upper secondary conductor member 70 and the upper end (referred to as "joint" hereinafter) 71a of the lower secondary conductor member 71 on the side of the secondary conductor 7. In addition, the connections 7A and 6A on the sides of the secondary conductors 6 and 7, respectively, are placed at set heights from the bottom 11 of an elevator passage, which heights are different from each other. Namely, there is a distance D2 between the height h3 of the joint 60a from the bottom 11 of the elevator passage on the side of the secondary conductor 6 and the height h2 of the joint 71a from the bottom 11 of the elevator passage on the side of the secondary conductor 7, the distance D2 being set to a value greater than the length of the primary windings 8 and 9 of the linear induction motor in the travel direction thereof.

In the linear motor driven elevator apparatus of the first embodiment having the above arrangement, the car 1 of the elevator is vertically moved along a car rail (not shown) provided in the elevator passage by the thrust which is generated by the interaction between an induced eddy current and a shifting magnetic field so as to drive the balance weight 10 and which is transmitted through the rope 4. The shifting magnetic field is generated by exciting the primary windings 8 and 9, and the eddy current is generated in the secondary conductors 6 and 7 by the shifting magnetic field, like in the conventional elevator.

Figure 3:
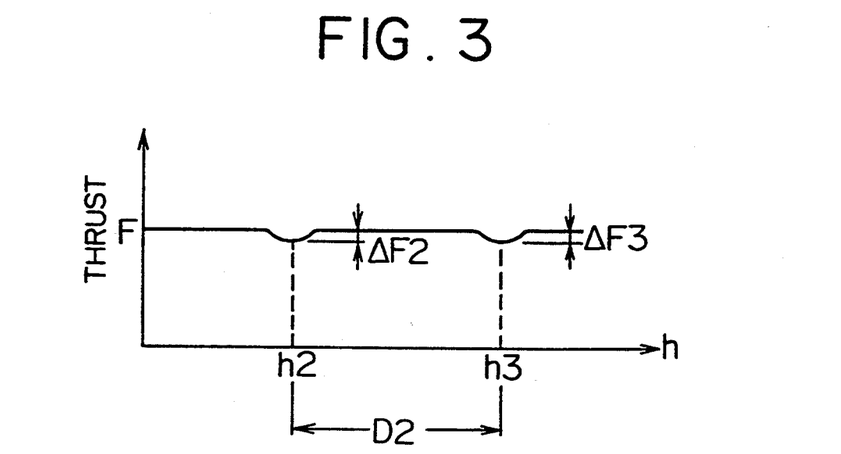
FIG. 3 is a diagram showing characteristics with respect to a thrust decrease in the first embodiment of the present invention.

In this embodiment, for example, if the balance weight 10 is upwardly moved from a position below the joint 70a, the balance weight 10, i.e., the primary windings 8 and 9 provided thereon, successively passes through the joints 70a, 71a. 60a, 61a. Although the thrust is decreased at the passage through each of the joints, the thrust is not much decreased at each of the joints because each of the secondary conductors 6 and 7 is not completely divided in the lengthwise direction thereof, and thus the eddy current I continuously passes through each of the joints in the secondary conductors 6 and 7. This is due to the structure of each of the connections 6A and 7A of the secondary conductors 6 and 7 in which the notch portions each having about half of the thickness of the member and respectively formed in the upper and lower secondary conductor members 60, 70 and 61, 71 are superposed. As a result, for example, the decreases in the thrust with centers at positions h2 and h3 are as shown by ΔF2 and ΔF3, respectively, in FIG. 3, and the thrust variation is significantly decreased, as compared with the thrust decrease ΔF1 of the conventional elevator.

In this embodiment, since the length D1 of each of the notch connections 6A and 7A in the secondary conductors 6 and 7 is set to a value greater than the pole pitch $\tau$ of the primary windings 8 and 9 of the linear induction motor, the thrust is not changed at the passage of the primary windings 8 and 9 through the notch portions of the secondary conductors 6 and 7, thereby stabilizing the travel of the balance weight 10.

Further, in this embodiment, since there is the distance D2, which is greater than the length $2\tau$ in the travel direction of the balance weight loaded with the primary windings 8 and 9 of the linear induction motor 1, between the height h3 of the joint 60a from the elevator passage bottom 11 on the side of the secondary conductor 6 and the height h2 of the joint 71a from the elevator passage bottom 11 on the side of the secondary conductor 7, the thrust is not simultaneously changed at the passage through the joints of the secondary conductors 6 and 7, thereby stabilizing the travel of the balance weight 10 throughout the whole process of the travel thereof.

Although, in the first embodiment, the present invention is applied to a double side linear induction motor, the present invention can be of course applied to secondary conductors in one line or three or more lines.

Embodiment 2

Figure 4:
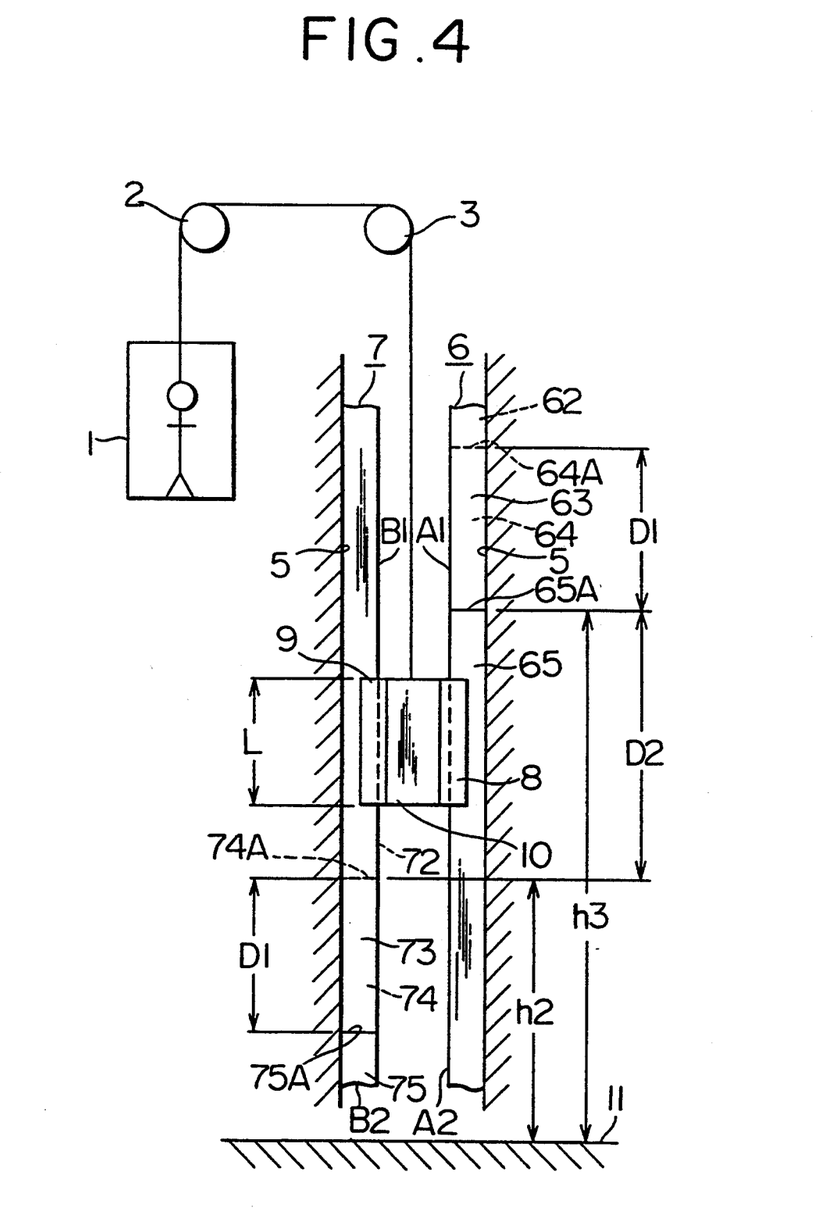
FIG. 4 is a schematic drawing showing the whole arrangement of a second embodiment of the present invention.
Figure 5A:
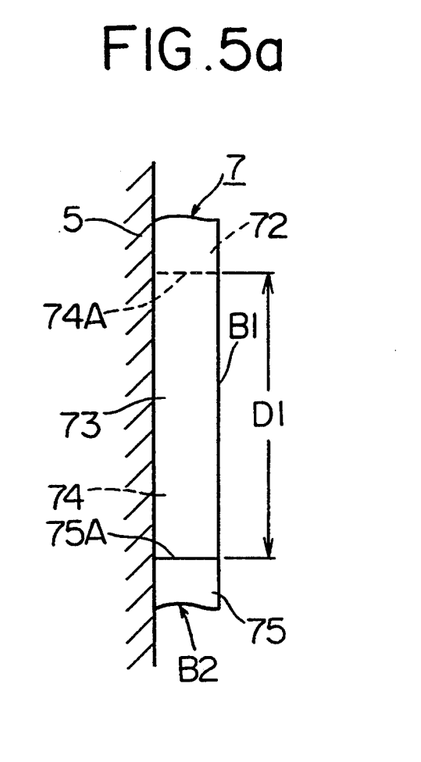
FIGS. 5(a) and 5(b) are a front view and a right side view, respectively, showing details of the connection of the secondary conductor members shown in FIG. 4.
Figure 5B:
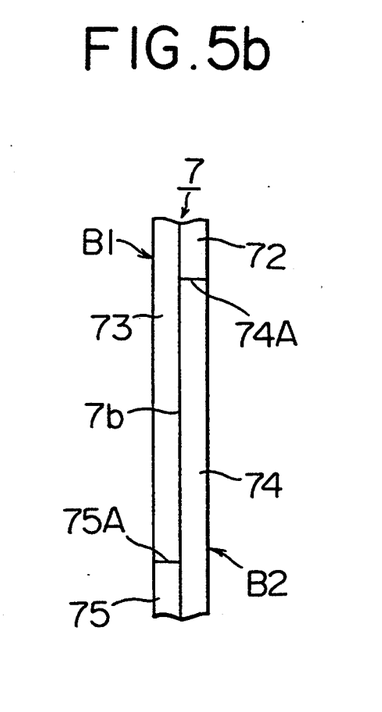

FIG. 4 is a schematic drawing showing the arrangement of a second embodiment of the present invention, and FIG. 5 is an enlarged front view and a right side view showing the connection in a secondary conductor which is a principal portion of the second embodiment. In this embodiment, secondary conductors are disposed in two lines, and the connection in each of the secondary conductors has a symmetrical structure. FIG. 5 shows the connection in one of the two lines. In the drawings, reference numerals 1 to 5 and 8 to 11 denote the same portions as those of the conventional elevator shown in FIG. 7, The same portions as those shown in FIG. 7 are not described below. Reference numerals 6 and 7 respectively denote secondary conductors in two lines which are related to the present invention and which have upper and lower secondary conductor members A1, A2 and B1, B2, respectively, disposed in series in the lengthwise direction thereof so as to be butted against each other. Each of the secondary conductor members A1, A2, B1 and B2 comprises two plate materials superposed. The secondary conductor members A1, A2, B1 and B3 are formed by superposing plate materials 62 and 63, 64 and 65, 72 and 73 and 74 and 75, respectively. The joints of the secondary conductor members A1 and A2 on the side of the secondary conductor 6, i.e., the joints 64A and 65A of the superposed plate materials 62, 63 and 64, 65 in the lengthwise direction thereof, are deviated from each other by a distance D1. Namely, the joints 64A and 65A are placed on the right and left sides of the interface (denoted by reference numeral 7b in FIG. 5) between the superposed plate materials at the distance D1 in the lengthwise direction. Similarly, the joints of the secondary conductor members B1 and B2 on the side of the secondary conductor 7, i.e., the joints 74A and 75A of the superposed plate materials 72, 73 and 74, 75 in the lengthwise direction thereof, are also placed on the right and left sides of the interface 7b at the distance D1 in the lengthwise direction. The distance D1 is set to a value greater than the length of the primary windings of the linear induction motor in the direction of the travel thereof, i.e., the length L of the primary iron core. In addition, the height h3 of the joint 65A from the elevator passage bottom 11 on the side of the secondary conductor 6 and the height h2 of the joint 74A from the elevator passage bottom 11 on the side of the secondary conductor 7 are different from each other by a distance D2 which is set to a value greater than the length L of the primary iron core.

In the linear motor driven elevator apparatus of the second embodiment having the above arrangement, the car 1 of the elevator is vertically moved along a car rail (not shown) provided in the elevator passage by the thrust which is generated by the interaction between an induced eddy current and a shifting magnetic field so as to drive the balance weight 10 and which is transmitted through the rope 4. The shifting magnetic field is generated by exciting the primary windings 8 and 9, and the induced eddy current is generated in the secondary conductors 6 and 7 by the shifting magnetic field, like in the conventional elevator and the first embodiment.

Figure 6:
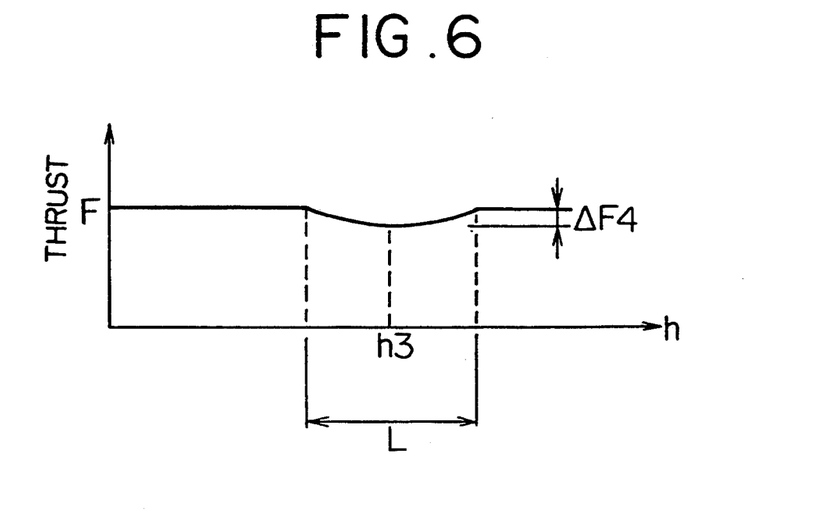
FIG. 6 is a diagram showing characteristics with respect to a thrust decrease in the second embodiment of the present invention.

In this embodiment, for example, if the balance weight 10 is upwardly moved from a position below the joint 75A, the balance weight 10, i.e., the primary windings 8 and 9 provided thereon, is passed through the joints 75A, 74A, 65A, 64A in that order. Although the thrust is decreased at the passage through each of the joints, the amount of thrust decrease is small at each of the joints because each of the secondary conductors 6 and 7 is not completely divided in the lengthwise direction thereof, and thus the eddy current I continuously passes through each of the joints in the secondary conductors 6 and 7. This is due to the structure of each of the connections in the secondary conductors 6 and 7 in which each of the upper and lower secondary conductor members A1, A2, B1 and B2 comprises two plate materials superposed, and the joints 64A and 65A (74A and 75A) are placed on the right and left sides of the interface between the plate materials at a distance D1 from each other in the lengthwise direction. As a result, for example, the decrease in the thrust with a center at a positions h3 is as shown by ΔF4 in FIG. 6, and the thrust variation is significantly decreased, as compared with the thrust decrease ΔF1 of the conventional elevator. In addition, the amount of the eddy current flowing is increased by an amount corresponding to the increase in the the thickness of the secondary conductor members, thereby obtaining greater thrust.

In this embodiment, since the set heights of the joints of the secondary conductor members A1 and A2, B1 and B2 are different from each other by the distance D1 which is set to a value greater than the length of the primary windings 8 and 9 of the linear induction motor in the direction of the travel thereof i.e., the length L of the iron core, the thrust change is decreased at the passage of the primary windings 8 and 9 through the joints of the secondary conductors 6 and 7, thereby stabilizing the travel of the balance weight 10.

Although, in the second embodiment, the present invention is applied to a case in which each of the secondary conductor members comprises two plate materials superposed, each secondary conductor member may comprise three or more plate materials. In this case, the thrust change at each of the joints can be further decreased.

As described above, in the first embodiment of the present invention, the connection of the secondary conductor members has a structure in which each of the secondary conductor members is notched to about half of the thickness thereof, and the notch portions are superposed. Since the secondary conductor members are not completely divided in the lengthwise direction thereof, the eddy current continuously flows even through the joints, thereby significantly decreasing the thrust variation at each of the joints. In addition, since the length of each of the notch connections of the secondary conductor members is set to a value greater than the pole pitch of the primary windings of the linear induction motor, the thrust does not vary at the passage of the primary windings through the notch portions of the secondary conductors, thereby stabilizing the travel of the car or the balance weight. Further, in the first embodiment, secondary conductors are disposed in a plurality of lines, and the primary windings of the linear inductor motor are respectively disposed in correspondence with the secondary conductors in the lines. Since the set height of the notch connection of the secondary conductor members differs with the line of the secondary conductor by a distance greater than the length of the primary windings of the linear induction motor in the direction of the travel thereof, the thrust does not simultaneously vary at the passage through the joints in the lines.

In the second embodiment of the present invention, secondary conductor members are disposed so that the joints of the plate materials of the secondary conductor members are deviated from each other. Thus a great thrust variation does not occur by simultaneous passage of the primary windings through a plurality of joints, thereby significantly decreasing the thrust variation at the passage through each of the joints and preventing an unpleasant impression from being given to the passengers by non-smooth movement of the car. Further, the amount of the eddy current flowing is increased by an amount corresponding to the increase in the thickness of the secondary conductor members, thereby obtaining greater thrust. In addition, since the distance between the joints of the plate materials is set to a value greater than the length of the windings of the linear induction motor in the direction of the travel thereof, the thrust does not vary at the passage of the primary windings through the joints of the secondary conductor members, thereby stabilizing the travel of the car or the balance weight.

What is claimed is:

1. A linear motor driven elevator apparatus comprising:

a secondary conductor disposed in an elevator passage, said secondary conductor having a plurality of secondary conductor members, each secondary conductor member including a notched portion disposed at a first end, the secondary conductor members being connected in series so that respective notched portions are abutted; and a linear inductor motor having primary windings loaded on a balance weight and respectively disposed near said secondary conductors;

wherein the notched portion of each of said secondary conductor members is notched to about half of the thickness of each of the secondary conductor members and the notched portion of each of the secondary conductor members has a length $(D_1)$ which is greater than the pole pitch $(\tau)$ of said primary windings of said linear induction motor.

2. A linear motor driven elevator apparatus comprising:

a first secondary conductor disposed in an elevator passage, said first secondary conductor having a plurality of secondary conductive members, each secondary conductive member including a notched portion disposed at a first end, the secondary members being connected in series so that respective notched portions are abutted against each other, the notched portions of each of said secondary conductor members being notched to about half of the thickness of the secondary conductor member;

a linear induction motor having primary windings loaded on a balanced weight and respectively disposed near said secondary conductors; and a second secondary conductor disposed in an elevator passage wherein the distance of the notch connection of the first secondary conductor from the bottom of the elevator passageway is greater than the distance of the notch connection of the second secondary conductor from the bottom of the elevator passageway by a distance $(D_2)$ which is greater than the length $(L)$ of said primary windings of said linear induction motor in the direction of travel thereof.

3. A linear motor driven elevator apparatus comprising:

a secondary conductor disposed in an elevator passage having first and second secondary conductor members connected in series in the lengthwise direction thereof so as to be abutted against each other; and a linear induction motor having primary windings disposed on a balance weight and positioned near said secondary conductor, each of said first and second secondary conductor members including first and second plate members, each plate member having first and second ends, the plate member being disposed such that the first end of the first plate member of the first secondary conductor is abutted against the first end of the second plate member of the second secondary conductor to form a first joint and the first end of the second plate member of the first secondary conductor member is abutted against the first end of the first plate member of the second secondary conductor to form a second joint and a lengthwise distance D exists between the first joint and the second joint wherein the lengthwise distance D, is greater than the length of said primary windings of said linear induction motor in the direction of travel thereof.

4. A linear motor driven elevator apparatus comprising:
- a secondary conductor disposed in an elevator passage having first and second secondary conductor members connected in series in a lengthwise direction thereof so as to be abutted against other;
- a linear induction motor having primary windings disposed on a balanced weight and positioned near said secondary conductors, each of said first and second secondary conductor members including first and second plate members, each plate member having first and second ends, the plate members being disposed such that the first end of the first plate member of the first secondary conductor is abutted against the first end of the second plate member of the second secondary conductor to form a joint and the first end of the second plate member of the first secondary conductor member is abutted against the first end of the first plate member of the second secondary conductor to form a second joint and a lengthwise distance D exist between the first joint and the second joint, the lengthwise distance D being greater than zero; and
- a second secondary conductor disposed in the elevator passage such that wherein the difference in the lengthwise distance of the first joint of said first secondary conductor from the bottom of the elevator passage and the lengthwise distance of the second joint of said second secondary conductor from the bottom of the elevator passage is greater than the length of the primary windings of said linear inductor motor.

* * * * *